(12) United States Patent
Yamano et al.

(10) Patent No.: US 8,582,655 B2
(45) Date of Patent: Nov. 12, 2013

(54) IMAGE PROCESSING APPARATUS, IMAGE PROCESSING METHOD, AND RECORDING MEDIUM

(75) Inventors: Takamasa Yamano, Kanagawa (JP); Tomoyuki Otsuki, Kanagawa (JP); Masashi Uchida, Tokyo (JP)

(73) Assignee: Sony Corporation, Tokyo (JP)

( * ) Notice: Subject to any disclaimer, the term of this patent is extended or adjusted under 35 U.S.C. 154(b) by 918 days.

(21) Appl. No.: 12/718,454

(22) Filed: Mar. 5, 2010

(65) Prior Publication Data

US 2010/0265394 A1 Oct. 21, 2010

(30) Foreign Application Priority Data

Apr. 16, 2009 (JP) ................................ 2009-100173

(51) Int. Cl.
*H04N 7/12* (2006.01)
*H04B 1/66* (2006.01)

(52) U.S. Cl.
USPC ..................................................... 375/240.16

(58) Field of Classification Search
None
See application file for complete search history.

(56) References Cited

U.S. PATENT DOCUMENTS 7,609,293 B2 * 10/2009 Faulkner et al. ........... 348/208.6
2009/0257498 A1 * 10/2009 Kurata ..................... 375/240.16

OTHER PUBLICATIONS

Wing Cheong Chan, et al., "Improved Global Motion Estimation Using Prediction and Early Termination", IEEE ICIP, vol. II, XP-002582761, Jun. 28, 2002, pp. 285-288.
Yosi Keller, et al., "Fast Gradient Methods Based on Global Motion Estimation for Video Compression", IEEE Transactions on Circuits and Systems for Video Technology. vol. 13. No. 4, XP-002582837, Apr. 30, 2003, pp. 300-309.
Frédéric Dufaux, et al., "Efficient, Robust, and Fast Global Motion Estimation for Video Coding", IEEE Transactions on Image Processing, vol. 9, No. 3, XP-002582838, Mar. 30, 2000, pp. 497-501.
S.F. Wu, et al., "A Differential Method for Simultaneous Estimation of Rotation, Change of Scale and Translation", Signal Processing: Image Communication, vol. 2, XP-002582863, May 2, 1990, pp. 69-80.

* cited by examiner

*Primary Examiner* — Nhon Diep
(74) *Attorney, Agent, or Firm* — Oblon, Spivak, McClelland, Maier & Neustadt, L.L.P.

(57) ABSTRACT

An image processing apparatus includes: a modeling unit, in video image data composed of frame images having an X direction and a Y direction perpendicular to the X direction, separating a motion from a standard image, which is one frame before a reference image subjected to a process, until the reference image into motions in the X and Y directions and representing the motions in the X and Y directions respectively as vector fields composed of a translation component composed of identical magnitude and direction regardless of positions in the X and Y directions, an X dependent component primarily changing with the position in the X direction, and a Y dependent component primarily changing with the position in the Y direction; and a calculation unit respectively calculating the translation component and the X and Y dependent components corresponding to the X and Y directions represented by the modeling unit.

17 Claims, 8 Drawing Sheets

IMAGE PROCESSING APPARATUS, IMAGE PROCESSING METHOD, AND RECORDING MEDIUM

BACKGROUND OF THE INVENTION

1. Field of the Invention

The present invention relates to an image processing apparatus, an image processing method, and a recording medium and is suitable for, for example, an application to an image processing apparatus that processes video image data.

2. Description of the Related Art

In the past, methods of detecting a motion vector representing a motion in the entire screen between frame images composing video image data (referred to below as a full screen motion vector) are proposed (for example, refer to IEEE Transactions on Consumer Electronics, Vol. 52, No. 2, May 2006).

Such a full screen motion vector is used mainly for image processing techniques using motions, such as time and spatial resolution creation processing, camera shake correction processing, object extraction processing, and tracking processing, for example.

SUMMARY OF THE INVENTION

In an image processing apparatus of such a configuration, motions in the entire screen is represented with a single full screen motion vector. However, since a screen moves for zooming, rotation, high speed pan tilt, and a combination thereof in a case that video image data is picked up in reality, it is difficult to represent the entire screen with a completely identical motion vector.

Accordingly, an image processing apparatus sometimes forcibly represent motions in the entire screen with a single full screen motion vector, and there has been a problem of having a large error in the full screen motion vector in such a case.

It is desirable to propose an image processing apparatus, an image processing method, and a recording medium that can represent motions in the entire screen more adequately.

According to an embodiment of the present invention, there is provided an image processing apparatus, provided with: a modeling unit, in video image data composed of a plurality of frame images where one direction in each of the frame images is defined as an X direction and a direction perpendicular to the one direction as a Y direction, separating a motion from a standard image, which is one frame before a reference image subjected to a process, until the reference image into a motion in the X direction and a motion in the Y direction and representing the motion in the X direction and the motion in the Y direction respectively as vector fields composed of a translation component composed of identical magnitude and direction regardless of positions in the X direction and the Y direction, an X dependent component primarily changing in correspondence with the position in the X direction, and a Y dependent component primarily changing in correspondence with the position in the Y direction; and a calculation unit respectively calculating the translation component, the X dependent component, and the Y dependent component corresponding to the X direction and the Y direction represented by the modeling unit.

This enables the image processing apparatus to represent the motion between the frame images as a vector field in which the motion changes in correspondence with a planar position.

Another embodiment of the present invention is an image processing method, provided with the steps of: modeling, in video image data composed of a plurality of frame images where one direction in each of the frame images is defined as an X direction and a direction perpendicular to the one direction as a Y direction, separating a motion from a standard image, which is one frame before a reference image subjected to a process, until the reference image into a motion in the X direction and a motion in the Y direction and representing the motion in the X direction and the motion in the Y direction respectively as vector fields composed of a translation component composed of identical magnitude and direction regardless of positions in the X direction and the Y direction, an X dependent component primarily changing in correspondence with the position in the X direction, and a Y dependent component primarily changing in correspondence with the position in the Y direction; and calculating the translation component, the X dependent component, and the Y dependent component corresponding to the X direction and the Y direction represented by the step of modeling.

This enables the image processing method to represent the motion between the frame images as a vector field in which the motion changes in correspondence with a planar position.

Still another embodiment of the present invention is a recording medium, provided with an image processing program recorded therein that makes a computer to perform the steps of: modeling, in video image data composed of a plurality of frame images where one direction in each of the frame images is defined as an X direction and a direction perpendicular to the one direction as a Y direction, separating a motion from a standard image, which is one frame before a reference image subjected to a process, until the reference image into a motion in the X direction and a motion in the Y direction and representing the motion in the X direction and the motion in the Y direction respectively as vector fields composed of a translation component composed of identical magnitude and direction regardless of positions in the X direction and the Y direction, an X dependent component primarily changing in correspondence with the position in the X direction, and a Y dependent component primarily changing in correspondence with the position in the Y direction; and calculating the translation component, the X dependent component, and the Y dependent component corresponding to the X direction and the Y direction represented by the step of modeling.

This enables the image processing program recorded in the recording medium to make the computer to represent the motion between the frame images as a vector field in which the motion changes in correspondence with a planar position.

According to embodiments of the present invention, the motion between the frame images can be represented as a vector field in which the motion changes in correspondence with a planar position, and thus it becomes possible to provide an image processing apparatus, an image processing method, and a recording medium that can more adequately represent a motion in the entire screen.

BRIEF DESCRIPTION OF THE DRAWINGS

FIGS. 1A through 1D are schematic diagrams illustrating vector fields while zooming in;

DESCRIPTION OF THE PREFERRED EMBODIMENTS

A description is given in detail below to embodiments of the present invention with reference to the drawings in the following order:
1. Embodiment (Detection of Six Parameter Motion Vector Field)
2. Other Embodiments

1. Embodiment

1-1. Definition of Six Parameter Vector Field

In a frame image according to the past, a motion vector representing a single motion in the entire screen (referred to below as a full screen motion vector Vg) is generally represented as (u, v) that shows a transverse (horizontal) component and a longitudinal (vertical) component.

However, as described above, it is rare that a motion between frame images can be represented as a single full screen motion vector Vg, and the motion vector often changes locally in correspondence with positions in the frame images.

For example, upon picking up an image of an object with a camcorder (not shown) as an image pickup apparatus that picks up video image data, a consideration is given to a case of zooming in in a direction of enlarging the object. At this point, a motion vector representing a motion from an image of the immediately before frame (referred to below as a standard image) until an image of the current frame (referred to below as a reference image) is not uniform in a frame image and it changes in correspondence with the position in the frame image as FIG. 1A.

Figure 1A:
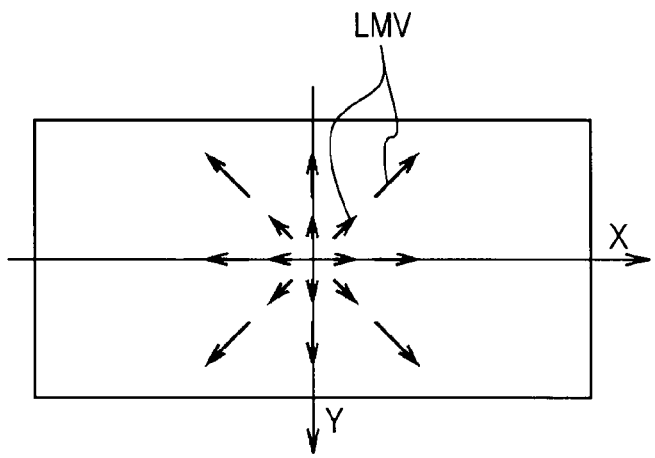

The motion vector that changes in correspondence with the position in a frame image is referred to below as a local motion vector LMV to be distinguished from the single full screen motion vector Vg that represents a motion in the entire screen. As in FIG. 1A, representation of the local motion vector LMV in the entire region of the frame image is referred to as a vector field. The transverse directions (horizontal directions) in a frame image are called X and the longitudinal directions (vertical directions) are called Y.

While zooming in, in the frame image, with the enlargement of the object, the local motion vector LMV is directed outwardly from a zoom center and the local motion vector LMV becomes greater as it goes outward. FIGS. 1A through 1D illustrate a case that the zoom center is at the center of the frame image.

Figure 1B:
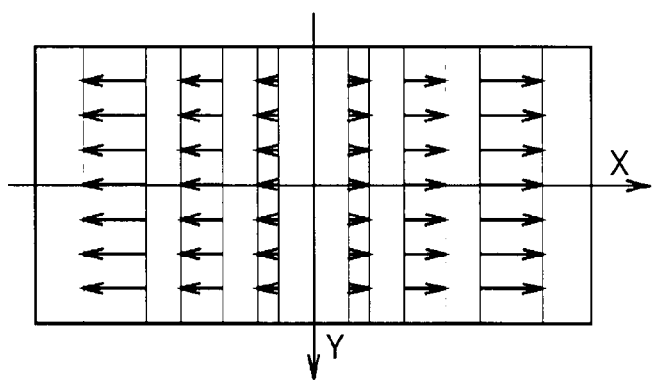
Figure 1C:
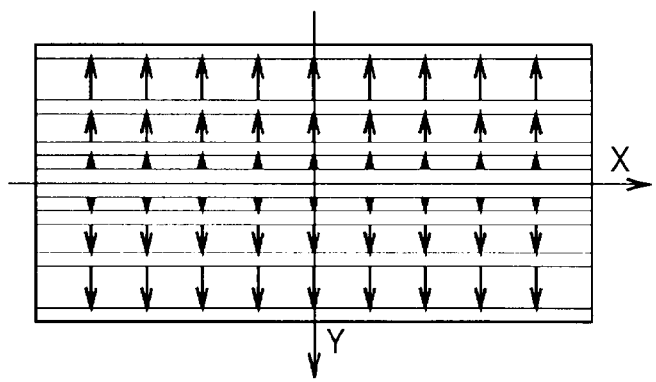

The vector field in FIG. 1A is decomposed into an X vector field that represents a local motion vector LMV only in the X direction and a Y vector field that represents a local motion vector LMV only in the Y direction respectively as in FIGS. 1B and 1C. That is, in the X vector field, the local motion vector LMV in the X direction primarily changes in correspondence with the x coordinate (position in the Y direction) and becomes greatest at the outermost ends in the transverse directions. This is also similar in the vector field in the Y direction, and the local motion vector LMV in the Y direction primarily changes in correspondence with the y coordinate (position in the X direction) and becomes greatest at the longitudinal top and bottom ends.

As illustrated in FIGS. 1B and 1C, while zooming in, the local motion vectors LMV in the symmetry coordinates, where the signs are opposite, become identical in size in the opposite direction. Consequently, in the full screen motion vector Vg, the motions of zooming in are balanced out with each other and almost do not appear substantially. This is also similar in zooming out.

Figure 2A:
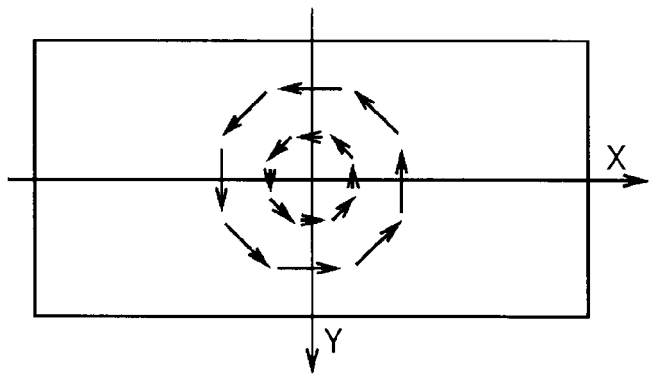
FIGS. 2A through 2D are schematic diagrams illustrating vector fields during rotation.

Next, a consideration is given to a case that a camcorder picks up an image of the object while slightly rotating the camcorder taking the center of the frame image as an axis. In this case, as illustrated in FIG. 2A, the local motion vector LMV rotates in one direction, and the magnitude becomes greater as it goes outward.

Figure 2B:
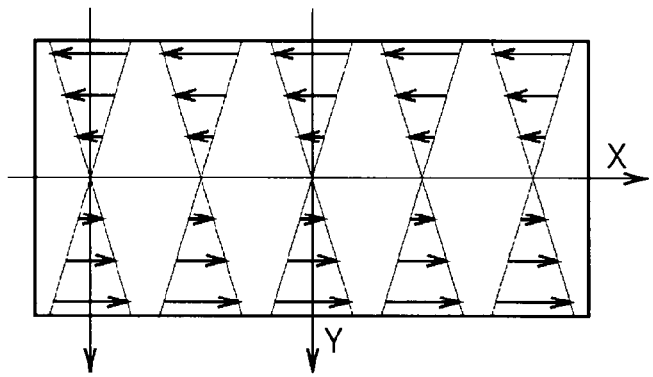

At this point, as illustrated in FIG. 2B, in the X vector field, the local motion vector LMV in the X direction becomes 0 on the X axis, and primarily changes as it goes at the top and bottom and the amplitude becomes greatest at the top and bottom ends in the longitudinal directions. That is, it is found that the magnitude of the local motion vector LMV in the X direction primarily increases or decreases in correspondence with the y coordinate (position in the Y direction) respectively.

Figure 2C:
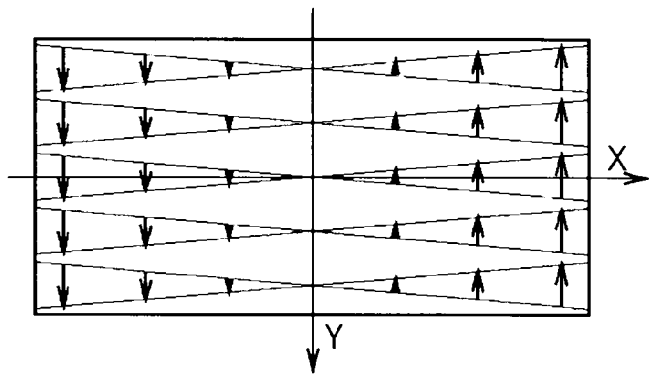

As illustrated in FIG. 2C, this is also similar in the Y vector field, and the local motion vector LMV in the Y direction becomes 0 on the Y axis and primarily changes as it goes towards the top and bottom and the amplitude becomes greatest at the outsides in the transverse directions. That is, it is found that the magnitude of the local motion vector LMV in the Y direction primarily increases or decreases in correspondence with the x coordinate (position in the X direction) respectively.

As illustrated in FIGS. 2B and 2C, during rotation, the local motion vectors LMV in the symmetry coordinates, where the signs are opposite, become identical in size in the opposite direction. Consequently, in the full screen motion vector Vg, the motions of rotation are balanced out with each other and almost do not appear substantially.

Translation (not shown) generated due to the movement of the camcorder in longitudinal and transverse directions and pan tilt appears as a local motion vector LMV composed of identical magnitude and direction in the frame image regardless of the x and y coordinates (positions in the X and Y directions).

With that, this embodiment of the present invention represents the vector field between the frame images, where arbitrary coordinates in the frame image are represented as (x, y), in the form of (u(x, y), v(x, y)) that changes depending on the coordinates.

Specifically, in this embodiment of the present invention, the X vector field is represented as the following expression by adding a translation parameter element $u_0$ that represents the translation component composed of identical magnitude and direction regardless of the positions in the X and Y directions, an X dependent component $u_x x$ that primarily changes in correspondence with the position in the X direction, and a Y dependent component $u_y y$ that primarily changes in correspondence with the position in the Y direction. Similarly, in this embodiment of the present invention, the Y vector field is represented as the following expression by adding a translation parameter element $v_0$ that represents the translation component composed of identical magnitude and direction regardless of the positions in the X and Y directions, an X dependent component $v_x x$ that primarily changes in correspondence with the position in the X direction, and a Y dependent component $v_y y$ that primarily changes in correspondence with the position in the Y direction.

$$(u(x,y), v(x,y)) = (u_0 + u_x x + u_y y, v_0 + v_x x + v_y y) \quad (1)$$

Figure 1D:
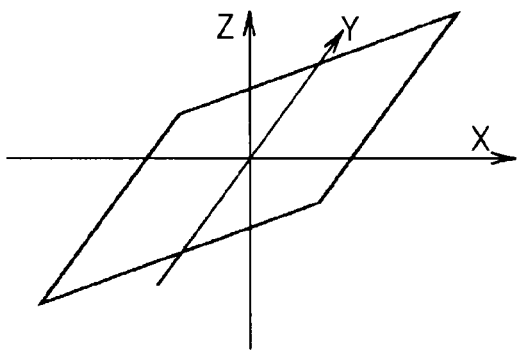

As the X vector field (u(x, y)) while zooming in illustrated in FIG. 1A is actually plotted three dimensionally with a value of u as the Z axis, it becomes a plane as in FIG. 1D. That is, in the X vector field while zooming in, the X dependent component $u_x x$ and the Y dependent component $u_y y$ primarily change, and it is confirmed that the X vector field can be represented as a primary plane. Although not shown, this is also similar in the Y vector field (v(x, y)).

Figure 2D:
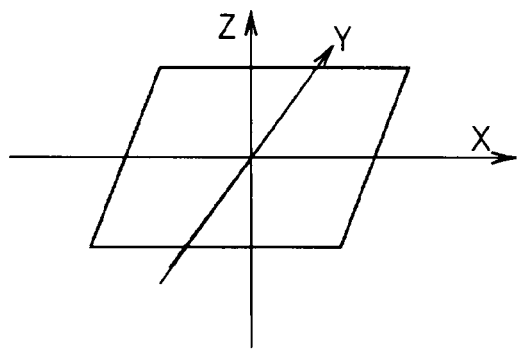

As the X vector field (u(x, y)) during rotation illustrated in FIG. 2A is plotted three dimensionally with the value of u as the Z axis, it becomes a plane as in FIG. 2D. That is, in the X vector field during rotation, the X dependent component $u_x x$ and the Y dependent component $u_y y$ primarily change, and it is confirmed that the X vector field can be represented as a primary plane. Although not shown, this is also similar in the Y vector field (v(x, y)).

That is, the translation parameter elements $u_0$ and $v_0$ as well as the X dependent parameter elements $u_x$ and $v_x$ and the Y dependent parameter elements $u_y$ and $v_y$ become factors represented in simple numbers. As a result, this embodiment of the present invention becomes possible to represent the vector fields by calculating the six parameter elements. A vector field represented by the expression (1) is referred to below as a six parameter vector field.

This enables this embodiment of the present invention to appropriately represent a motion that has been difficult to be represented with a full screen motion vector Vg that is represented as a single motion of the entire frame image by representing the motion of the entire frame image associated with a behavior of the camcorder as a six parameter vector field represented in the expression (1).

1-2. Configuration of Image Processing Apparatus

Figure 3:
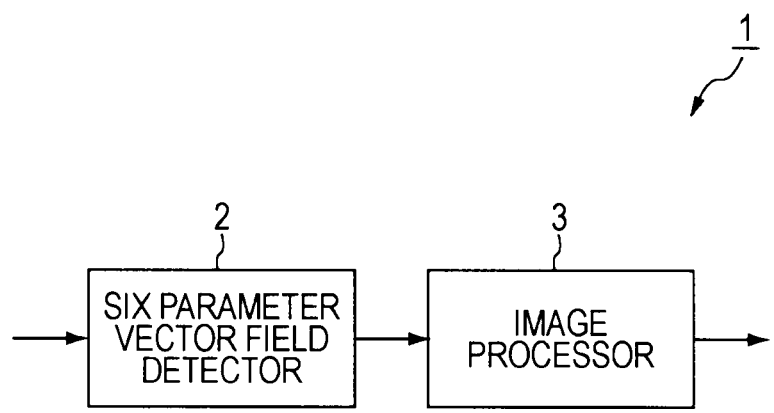
FIG. 3 is a schematic diagram illustrating a configuration of an image processing apparatus.

As illustrated in FIG. 3, a reference numeral 1 denotes an image processing apparatus according to the present embodiment as a whole. As an input image of video image data is supplied, a six parameter vector field detector 2 detects a six parameter vector field representing the motion of the current reference image relative to the last standard image per frame image. That is, the six parameter vector field detector 2 calculates six parameter elements (translation parameter elements $u_0$ and $v_0$, X dependent parameter elements $u_x$ and $v_x$, and Y dependent parameter elements $u_y$ and $v_y$) in the expression (1).

The six parameter vector field detector 2 supplies the detected six parameter vector fields and the input image to an image processor 3. The image processor 3 performs image processing (described later in detail) to the input image based on the six parameter vector field to output the processed input image as an output image.

Next, a description is given to a method of calculating the six parameter elements.

As a general method of calculating a local motion vector LMV, block matching algorithms are widely applied. An image processing apparatus in the past performing such a block matching algorithm moves a process block subjected to processing in a standard image in correspondence with all vectors within the search range in a reference image for matching (difference calculation). As a block is obtained in the reference image that gives the lowest evaluation value (difference value), the image processing apparatus in the past then detects a corresponding vector as a motion vector of the process block.

Although such a block matching algorithm can be a simple but highly relevant approach, it performs matching to all the blocks within the search range, so that it has disadvantages of a greater load of processing when the search range is large or the number of blocks in the frame image increases.

Figure 4:
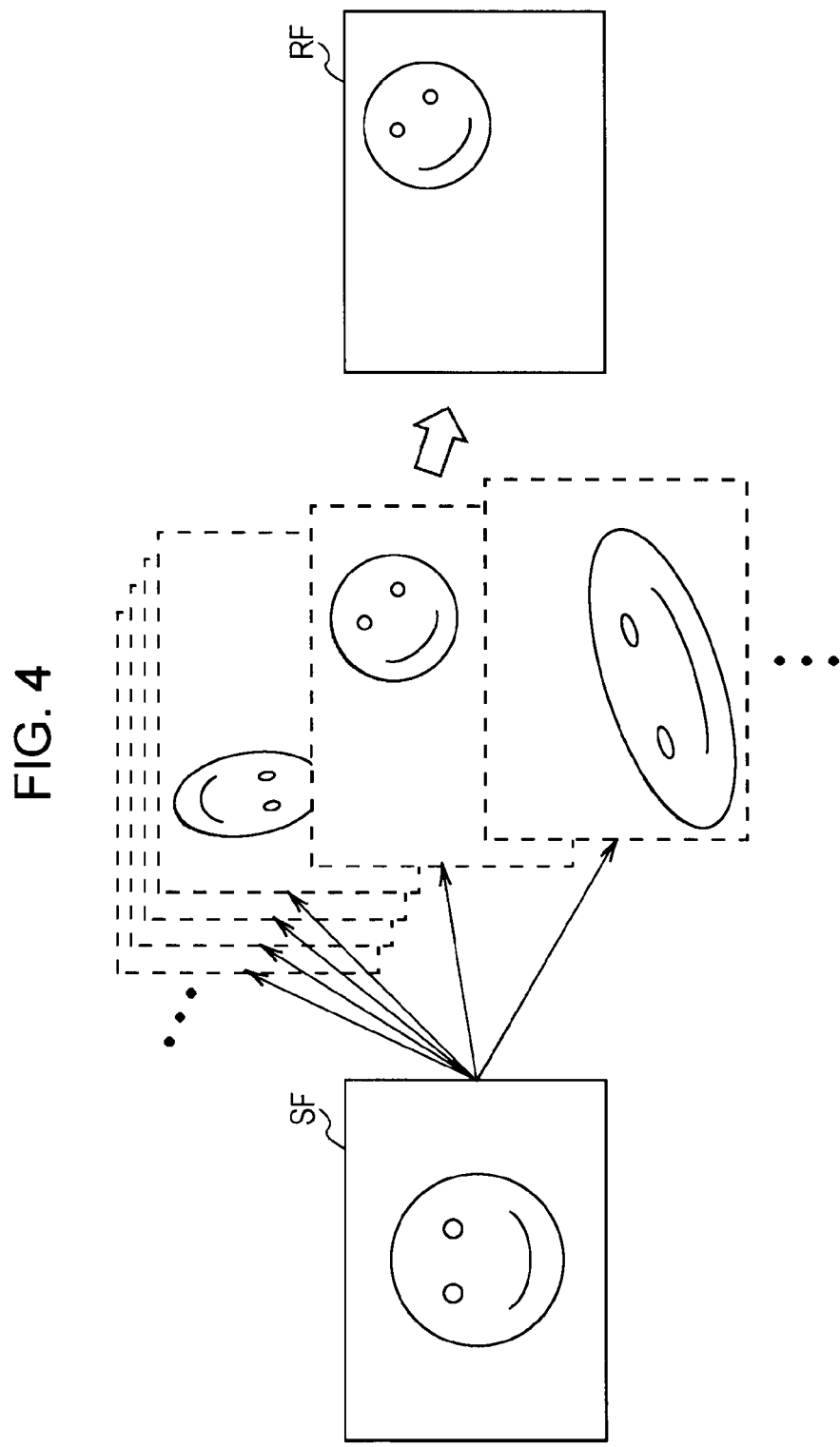
FIG. 4 is a conceptual diagram of a full search.

A consideration is given to a case of applying such block matching algorithm, which carries out a full search within a search range, to the calculation of the six parameter elements. That is, as a concept is illustrated in FIG. 4, the image processing apparatus establishes a finite search range to the six parameter elements and moves the process block in correspondence with a vector composed of combinations of all the possible parameter elements within the search range for matching. The image processing apparatus then detects a vector corresponding to the lowest evaluation value as a motion vector of the process block.

In this case, although the image processing apparatus can calculate the six parameter elements by simple processing, the search range includes all of the possible combinations of the six parameter elements, so that the number of the searches becomes extremely huge as in a sextuplicate order. Accordingly, as the image processing apparatus performs the block matching algorithm, it has to perform a huge number of arithmetic processes.

Figure 5:
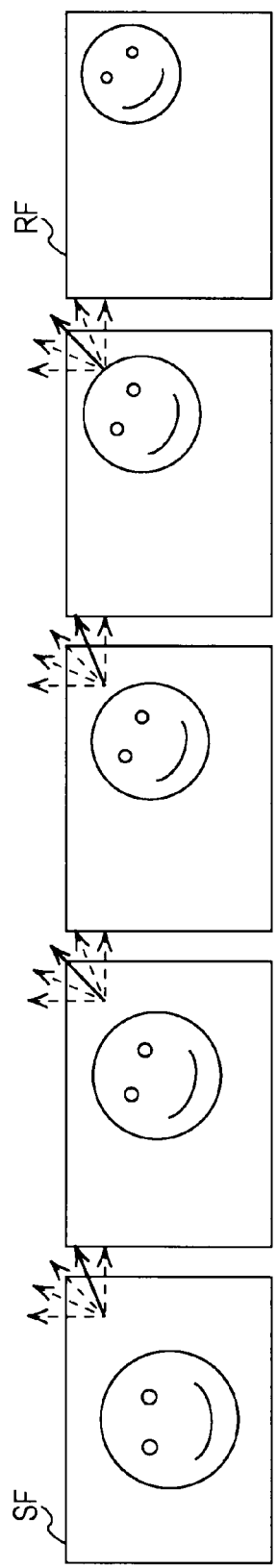
FIG. 5 is a conceptual diagram of a local search method.

With that, the image processing apparatus 1 in the present embodiment performs a six parameter individual local search process upon detecting the six parameter vector field. In the six parameter individual local search process, as a concept is illustrated in FIG. 5, the image processing apparatus 1 changes the element value little by little towards an appropriate element value per parameter element and thereby detects an element value as the optimal solution finally.

1-3. Detection of Six Parameter Vector Field

The six parameter vector field detector 2 of the image processing apparatus 1 establishes an initial parameter in the six parameter individual local search process and changes an element value little by little, until detecting an appropriate element value as the optimal solution from the element value in the initial parameter, towards the appropriate element value. Consequently, the six parameter vector field detector 2 can reduce the processing period until detecting the appropriate element value by establishing an appropriate initial parameter.

With that, the six parameter vector field detector 2 selects a most appropriate initial parameter from a plurality of initial value options. Firstly, the six parameter vector field detector 2 calculates the full screen motion vector Vg used for calculating initial value options.

1-3-1. Detection of Full Screen Motion Vector

Figure 6:
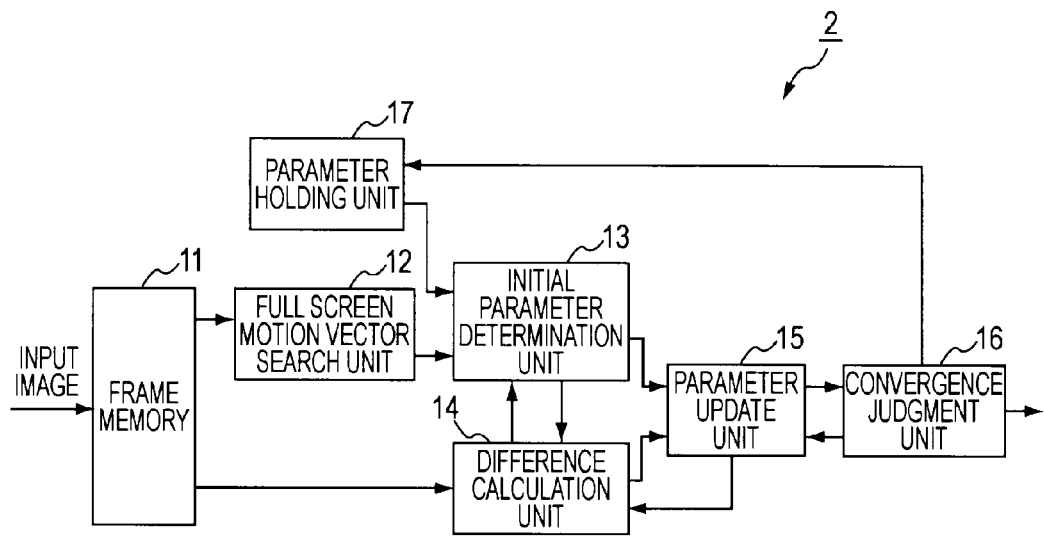
FIG. 6 is a schematic diagram illustrating a configuration of a six parameter vector field detector.

As illustrated in FIG. 6, the six parameter vector field detector 2 of the image processing apparatus 1 temporarily memorizes sequentially supplied input images in a frame memory 11.

A full screen motion vector search unit 12 reads a reference image subjected to processing and a standard image, which is a frame image immediately before the reference image, from the frame memory 11. The full screen motion vector search unit 12 calculates the full screen motion vector Vg of the reference image relative to the standard image by a general block matching algorithm shown in the following expression.

In the expression, t denotes time, and the frame image corresponding to the time t is the standard image and the frame image corresponding to time t+1 is the reference image. The characters x and y respectively denote the coordinates of X and Y in the standard image, and (x+u) denotes the movement of x by u in the standard image.

$$D(u, v) = \sum_x \sum_y |I_{t+1}(x + u, y + v) - I_t(x, y)| \quad (2)$$

$$Vg=(u_g,v_g)|\min D(u_g,v_g) \quad (3)$$

That is, D(v, u) denotes a difference value D of subtraction of a pixel value $I_t(x, y)$ in the standard image from a pixel value $I_{t+1}$ in the reference image corresponding to the position of a pixel in the standard image moved by a vector (u, v). The full screen motion vector search unit 12 searches the vector (v, u) and determines the vector (v, u), which has the smallest difference value D (v, u), as the full screen motion vector $Vg=(v_g, u_g)$. The full screen motion vector search unit 12 may provide a limitation (search area) to a certain extent in the search range for the vector (v, u) from the perspective of the amount of operations.

The full screen motion vector search unit 12 supplies the detected full screen motion vector Vg to an initial parameter determination unit 13. The initial parameter determination unit 13 is designed to use the full screen motion vector Vg for a second initial value option among three initial value options.

1-3-2. Determination of Initial Parameter

The initial parameter determination unit 13 establishes a respective initial value, as shown in the following expression, for each of the six parameter elements as an initial parameter $P^t$. As described later in detail, the six parameter vector field detector 2 performs the six parameter individual local search process, in which each of the parameter elements are varied little by little until reaching the optimal solutions. Accordingly, the initial parameter determination unit 13 can decrease a number of steps in the search process until each of the six parameter elements becomes the optimal solution by establishing an appropriate initial parameter $P^t$.

A previous frame parameter $P^{t-1}$ corresponds to the six parameter vector field between a standard image and a frame image immediately before the standard image (referred to below as a previous frame vector field).

$$P^t=(u_0,u_x,u_y,v_0,v_x,v_y)^t \quad (4)$$

The initial parameter determination unit 13 determines a first initial value option $P^t\_1$ through a third initial value option $P^t\_3$ as the three initial value options.

Firstly, the initial parameter determination unit 13 determines the first initial value option $P^t\_1$ referring to the previous frame vector field. The initial parameter determination unit 13 determines the previous frame parameter $P^{t-1}$ supplied from a parameter holding unit 17 directly as the first initial value option $P^t\_1$ as shown in the following expression. The first initial value option $P^t\_1$ is established by supposing that the six parameter vector field between the standard image and the reference image (referred to below as a search object vector field) is almost identical to the previous frame vector field and is selected mainly in a case that the frame image is picked up in a constant motion.

$$P^t\_1=P^{t-1} \quad (5)$$

The initial parameter determination unit 13 determines a second initial value option $P^t\_2$ with reference to the full screen motion vector Vg. The initial parameter determination unit 13 determines the full screen motion vector $Vg(u_g, v_g)$ supplied from the full screen motion vector search unit 12 as translation parameter elements $u_0$ and $v_0$ in the second initial value option $P^t\_2$ and X dependent parameter elements $u_x$ and $v_x$ and Y dependent parameter elements $u_y$ and $v_y$ as 0 as shown in the following expression.

$$P^t\_2=(u_g,0,0,v_g,0,0) \quad (6)$$

The second initial value option $P^t\_2$ is established by supposing that the search object vector field rapidly changes and is selected mainly in such a case that the motion of the camcorder changes rapidly. In the rotation and zooming described above, the local motion vectors LMV that are symmetric to each other with the origin as the center balance out the components of each other. Consequently, in rotation and zooming, the full screen motion vector Vg substantially becomes almost 0.

That is, in a case that a rapid change is generated in a motion between the frame images, although only the translation component appears as the full screen motion vector Vg, changes, such as rotation, zooming in, and zooming out, hardly appear in the full screen motion vector Vg. Consequently, the initial parameter determination unit 13 uses the full screen motion vector Vg only as the translation component in the second initial value option $P^t\_2$.

The initial parameter determination unit 13 determines all of translation parameter elements $u_0$ and $v_0$, X dependent parameter elements $u_x$ and $v_x$, and Y dependent parameter elements $u_y$ and $v_y$ in the third initial value option $P^t\_3$ as 0 as shown in the following expression.

$$P^t\_3=(0,0,0,0,0,0) \quad (7)$$

The third initial value option $P^t\_3$ is established by supposing that there is nothing to refer to, and is selected mainly when a rapid change is generated in the frame image (picture and the like) itself, for example, a scene change, fireworks, a case of using a flash during image pickup.

The initial parameter determination unit 13 then supplies the first initial value option $P^t\_1$ through the third initial value option $P^t\_3$ to a difference calculation unit 14.

The difference calculation unit 14 calculates difference values when using the first initial value option $P^t\_1$ through the third initial value option $P^t\_3$ as parameters in accordance with an expression (8) led by substituting the expression (1) into the expression (2) to supply it to the initial parameter determination unit 13.

$$D(u, v) = \sum_x \sum_y |I_{t+1}(x + u_0 + u_x x + u_y y, y + v_0 + v_x x + v_y y) - I_t(x, y)| \quad (8)$$

That is, the difference calculation unit 14 calculates difference values D(P) by subtracting the pixel value $I_t(x, y)$ in the standard image from the pixel value $I_{t+1}$ of a pixel of the reference image corresponding to the pixel of the standard image (that is, when the pixel of the standard image is moved by the six parameter vector field (u, v) based on the first initial value option P′_1 through the third initial value option P′_3).

Figure 7:
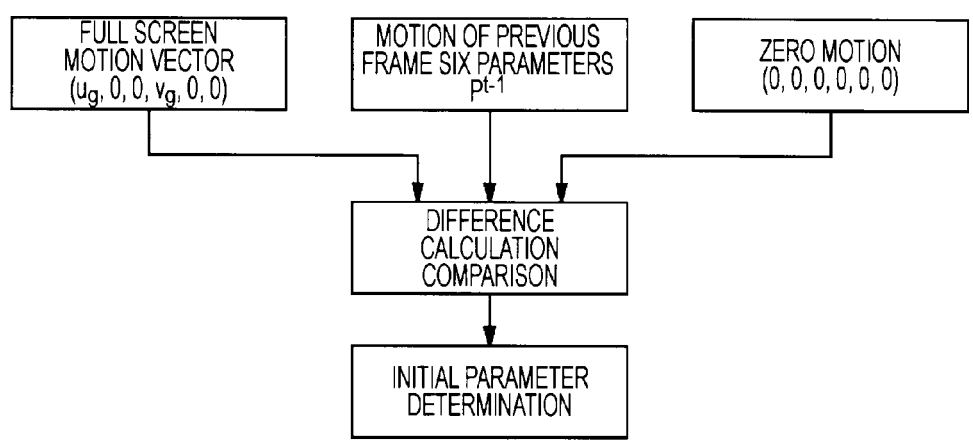
FIG. 7 is a schematic diagram served for an illustration of an initial parameter determination process.

As illustrated in FIG. 7, the initial parameter determination unit 13 compares the difference values D(P) to determine the initial value option corresponding to the difference value D(P) having the lowest value as the initial parameter P′.

That is, the initial parameter determination unit 13 identifies pixels where each of the pixels of the standard image is moved by the six parameter vector field represented by the initial value options as the pixels corresponding to the standard image in the reference image. The initial parameter determination unit 13 calculates the difference values D(P) by subtracting the pixel value of the standard image from the pixel values of the pixels corresponding to the standard image in the reference image. In other words, the initial parameter determination unit 13 moves the pixel values of the reference image in correspondence with the initial value options to determine the initial value option nearest to the standard image as the initial parameter P′.

This enables the initial parameter determination unit 13 to determine the initial value option having the element value nearest to each of the parameter elements in the search object vector field as the initial parameter P′. The initial parameter determination unit 13 supplies the determined initial parameter P′ to a parameter update unit 15.

The initial parameter determination unit 13 thus determines the initial value option selected from the first initial value option P′_1 through the third initial value option P′_3 as the initial parameter P′.

1-3-3. Six Parameter Individual Local Search Process

As the initial parameter P′ is supplied from the initial parameter determination unit 13, the parameter update unit 15 starts a six parameter individual local search process. That is, the parameter update unit 15 firstly defines the initial parameter P′ as a current parameter P.

The parameter update unit 15 increases and decreases the value of $u_0$ by a search increase and decrease value $\epsilon$ composed of a slight increase and decrease range in terms of the current parameter P shown in an expression (9), and thereby generates an increased parameter P+ and a decreased parameter P− respectively shown in expressions (10) and (11). The parameter update unit 15 supplies the current parameter P, the increased parameter P+, and the decreased parameter P− to the difference calculation unit 14.

$$P = (u_0, u_x, u_y, v_0, v_x, v_y) \quad (9)$$

$$P+ = (u_0 + \epsilon, u_x, u_y, v_0, v_x, v_y) \quad (10)$$

$$P- = (u_0 - \epsilon, u_x, u_y, v_0, v_x, v_y) \quad (11)$$

The difference calculation unit 14 generates difference values D(P), D(P+), and D(P−) respectively using the current parameter P, the increased parameter P+, and the decreased parameter P− in accordance with the expression (8) to supply them to the parameter update unit 15. At this point, the difference calculation unit 14 models the motion between the frame images as the six parameter vector field using the expression (8) where the expression (1) is substituted into the expression (2).

Figure 8:
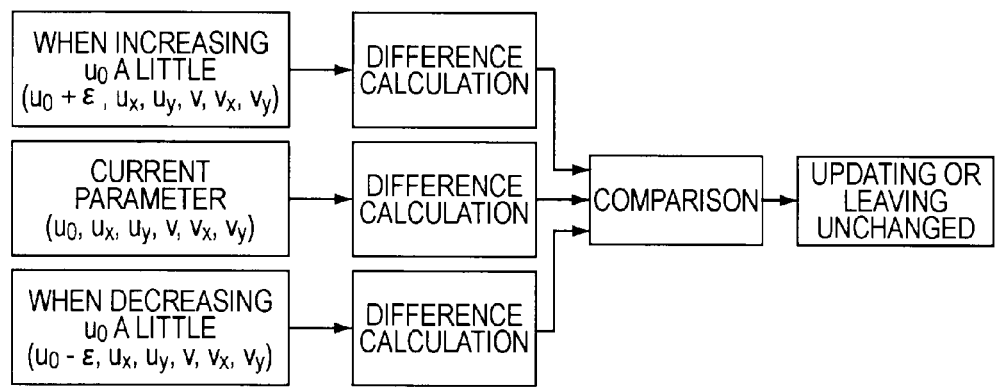
FIG. 8 is a schematic diagram served for an illustration of an individual search per parameter.

The parameter update unit 15 compares the difference values D(P), D(P+), and D(P−) as shown in FIG. 8 to select the parameter corresponding to the smallest difference value D out of the current parameter P, the increased parameter P+, and the decreased parameter P−.

In a case that the selected parameter is the increased parameter P+ or the decreased parameter P−, the parameter update unit 15 judges that $u_0 + \epsilon$ or $u_0 - \epsilon$, which are increased or decreased by the search increase and decrease value $\epsilon$, is near to the optimal solution as the translation parameter element $u_0$. The parameter update unit 15 updates the translation parameter element $u_0$ in the current parameter P to the translation parameter element $u_0$ in the selected increased parameter P+ or decreased parameter P−.

In a case that the selected parameter is the current parameter P, the parameter update unit 15 does not update the translation parameter element $u_0$ and leaves the current parameter P unchanged.

The parameter update unit 15 performs similar processes for the six parameter elements (the translation parameter elements $u_0$ and $v_0$, the X dependent parameter elements $u_x$ and $v_x$, and Y dependent parameter elements $u_y$ and $v_y$). That is, the parameter update unit 15 increases and decreases the value of the X dependent parameter element $u_x$ from the current parameter P (before updating the translation parameter element $u_0$) by the search increase and decrease value $\epsilon$ to generate the increased parameter P+ and the decreased parameter P−, and supplies them to the difference calculation unit 14.

The difference calculation unit 14 has already calculated the difference value D(P) relative to the current parameter P upon calculating the difference value D relative to the translation parameter element $u_0$. Consequently, the difference calculation unit 14 calculates the difference values D(P+) and D(P−) only of the increased parameter P+ and decreased parameter P− in terms of the second and later parameter elements in the search process.

The difference calculation unit 14 generates the difference values D(P+) and D(P−) respectively using the current parameter P, the increased parameter P+, and the decreased parameter P− in accordance with the expression (8) and supplies them to the parameter update unit 15 (FIG. 6).

The parameter update unit 15 compares the difference values D(P), D(P+), and D(P−) to select the X dependent parameter element $u_x$ corresponding to the smallest difference value D out of the current parameter P, the increased parameter P+, and the decreased parameter P− as the X dependent parameter element $u_x$ in the current parameter P, and updates the X dependent parameter element $u_x$ as desired.

The parameter update unit 15 and the difference calculation unit 14 respectively generate the difference values D(P+) and D(P−) also for the translation parameter element $v_0$, the X dependent parameter element $v_x$, and the Y dependent parameter elements $u_y$ and $v_y$ similarly. The parameter update unit 15 selects the translation parameter element $v_0$, the X dependent parameter element $v_x$, and the Y dependent parameter elements $u_y$ and $v_y$ corresponding to the smallest difference value D respectively as each of the parameter elements in the current parameter P and updates each of the parameter elements as desired.

That is, the parameter update unit 15 selects the parameter element corresponding to the smallest difference value D in terms of the six parameter elements respectively as each of the parameter elements in the current parameter P and updates each of the parameter elements as desired.

The above process from establishing the current parameter P until selecting the next current parameter P is referred to as a search process in the six parameter individual local search process. In the operation of the difference value D in one step of this search process, element values at the time of starting the search process are used for element values other than the search object parameter element.

This allows the six parameter vector field detector 2 to calculate the difference value D(P) for the current parameter P only once in one step of the search process. As a result, the six parameter vector field detector 2 can decrease the number of operations of the difference value D in one step compared with a method of successively re-calculating the difference value D of the current parameter P while updating the element values in the current parameter P.

As finishing the search process, the parameter update unit 15 supplies the current parameter P to a convergence judgment unit 16.

The convergence judgment unit 16 holds the current parameter P before performing the search process (referred to below as a before search parameter). As the current parameter P is supplied, the convergence judgment unit 16 compares the before search parameter with the current parameter P to judge whether or not any of the six parameter elements is updated.

In a case that any of the six parameter elements is updated, the convergence judgment unit 16 performs the search process again without altering the search increase and decrease value $\epsilon$. The convergence judgment unit 16 repeatedly performs the search process until all of the six parameter elements are not updated.

That is, the six parameter vector field detector 2 performs the search process respectively for the six parameter elements by modifying the element values of the parameter elements one by one by the search increase and decrease value $\epsilon$ and continues updating the parameter elements in the current parameter P towards the parameter elements with an even smaller difference value D.

Since the six parameter vector field detector 2 converges each of the parameter elements while gradually varying all parameter elements, even in a case that one parameter element is accidentally converged to a false minimum value, it can update the false minimum value in correspondence with the variation of other parameter elements. As a result, the six parameter vector field detector 2 can search the optimal solutions for all of the six parameter elements (that is, correct element values for the parameter elements).

The six parameter vector field detector 2 calculates the difference value D(P) only once for a search process in one step. Since the six parameter vector field detector 2 increases and decreases the six parameter elements individually, it calculates the difference values D(P+) and D(P−) respectively for the six parameter elements. Consequently, the six parameter vector field detector 2 may calculate the difference value D in 1+6×2=13 times in one step.

This enables the six parameter vector field detector 2 to calculate the optimal solutions for the six parameter elements by a simple process without increasing the number of operations of the difference value D in one step.

In a case that all of the six parameter elements are not updated, the convergence judgment unit 16 confirms the search increase and decrease value $\epsilon$. In a case that the search increase and decrease value $\epsilon$ is equal to or more than a finishing threshold, the search increase and decrease value $\epsilon$ is large, so that the convergence judgment unit 16 performs the search process with a smaller (half, for example) search increase and decrease value $\epsilon$.

This enables the convergence judgment unit 16 to firstly establish the search increase and decrease value $\epsilon$ largely to roughly estimate the optimal solution for each element value, and then searches each element value in detail by altering the search increase and decrease value $\epsilon$ to be smaller with the roughly estimated optimal solutions as the starting points. This enables the convergence judgment unit 16 to decrease the number of steps in the search process without lowering the accuracy of the parameter element searches.

In a case that the search increase and decrease value $\epsilon$ is less than the finishing threshold, the convergence judgment unit 16 determines the current parameter P as the six parameter elements in the search object vector field and finishes the six parameter individual local search process. At this point, the convergence judgment unit 16 temporarily memorizes the determined current parameter P in the parameter holding unit 17.

Upon processing a six parameter individual local search for the following search object vector field, the determined current parameter P is used as the previous frame parameter $P^{f-1}$ in the previous frame vector field.

The six parameter vector field detector 2 determines the element values of the six parameter elements with the smallest difference value D between the pixel value of the motion brought back in correspondence with the search object vector field from the reference image and the pixel value of the standard image as the optimal solutions in the search object vector field.

The six parameter vector field detector 2 searches the optimal solutions for the parameter elements while varying the element values of the six parameter elements little by little and one by one. This enables the six parameter vector field detector 2 to suppress the arithmetic processes in one step and also detect the element values indicating the smallest difference value D in terms of all of the six parameter elements as the optimal solution for each of the parameter elements. As a result, the six parameter vector field detector 2 can detect the search object vector field by a simple process at high accuracy.

The series of six parameter vector field detection process described above can be performed by hardware and also by software. In a case of providing the six parameter vector field detection process by software, the six parameter vector field detector 2 is virtually formed in a CPU and a RAM. A six parameter vector field detection program stored in the ROM is then developed for the RAM, and thereby the six parameter vector field detection process is performed.

1-4. Image Processing

The image processor 3 (FIG. 3) in the image processing apparatus 1 performs various image processing, such as resolution creation processing, camera shake correction processing, object extraction processing, or tracking processing, using the six parameter vector field detected by the six parameter vector field detector 2.

In a case of performing temporal resolution creation processing, for example, the image processor 3 generates an interpolation frame image where the standard image is moved by half of the six parameter vector field to impose it between the standard image and the reference image.

Image processors in the past generate an interpolation frame image that is moved by half of the full screen motion vector Vg. Consequently, although the interpolation frame image can reflect a motion similar to the actual pixel movement for translation movements, it used to show a motion different from the actual pixel movement in terms of rotations and zoomings.

Since the image processor 3 has a component dependent on the X and Y coordinates, it can reflect the actual pixel motion to the interpolation frame image in terms of rotations and zoomings as well and thus the temporal resolution can be even improved compared to interpolation processes in the past.

In a case of performing spatial resolution creation processing, the image processor 3 generates an interpolation pixel where the standard image is moved by half of the six parameter vector field to impose it between the pixels in the reference image. Since this enables the image processor 3 to generate the interpolation pixel by reflecting the actual pixel motion in correspondence with the X and Y coordinates, it is possible to even improve the spatial resolution compared with interpolation processes in the past.

In a case of performing camera shake correction processing, the image processor 3 detects a camera shake component that indicates a small vibration from the six parameter vector field. Here, the camera shake component is assumed to be a motion of translation and rotation. The six parameter vector field due to rotation appears as a point symmetric local motion vector LMV in terms of the origin as illustrated in FIGS. 2A to 2D.

The image processor 3 can perform the camera shake correction to the frame image by balancing the camera shake component out of the reference image. Since this enables the image processor 3 to perform the camera shake correction not only for translation but also for rotation, it is possible to improve the accuracy of camera shake correction compared to a case of using the full screen motion vector Vg.

The image processor 3 extracts a region in which a local motion vector LMV greatly different from the six parameter vector field exists as an object upon object extraction processing. Since the image processor 3 appropriately represents the motion of the entire frame image as the six parameter vector field, the difference from the local motion vector LMV in the object can be clarified and thus the object can be appropriately extracted.

The tracking processing is assumed to be performed in the camcorder. That is, the image processor 3 in the camcorder extracts the object by object extraction processing during the tracking processing. The camcorder focuses on the extracted object by driving a lens group, not shown, to constantly focus on the object.

The image processor 3 can thus use the six parameter vector field as an alternative for the full screen motion vector Vg in a variety of image processing. Since the error included in the six parameter vector field is far smaller than the error included in the full screen motion vector Vg, the image processor 3 can improve the accuracy of each image processing.

The image processor 3 may perform not all of the resolution creation processing, the camera shake correction processing, the object extraction processing, and the tracking processing but may perform at least one or more types of the above image processing. It is also possible to use the six parameter vector field as an alternative for all types of the image processing using the full screen motion vector Vg.

1-5. Processing Procedure

Figure 9:
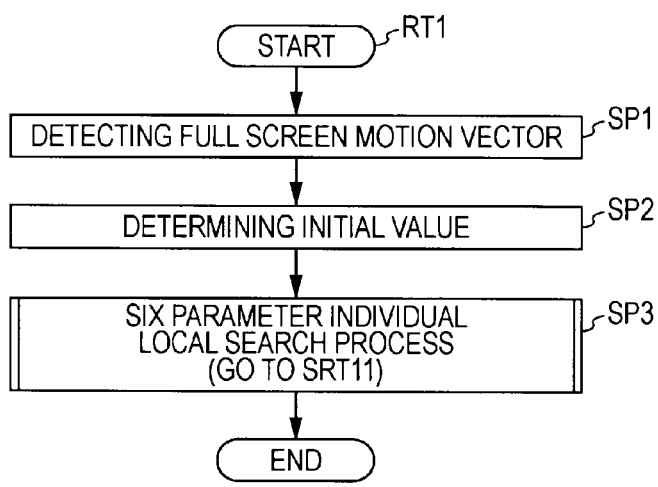
FIG. 9 is a flowchart served for an illustration of a procedure for processing six parameter vector field detection.
Figure 10:
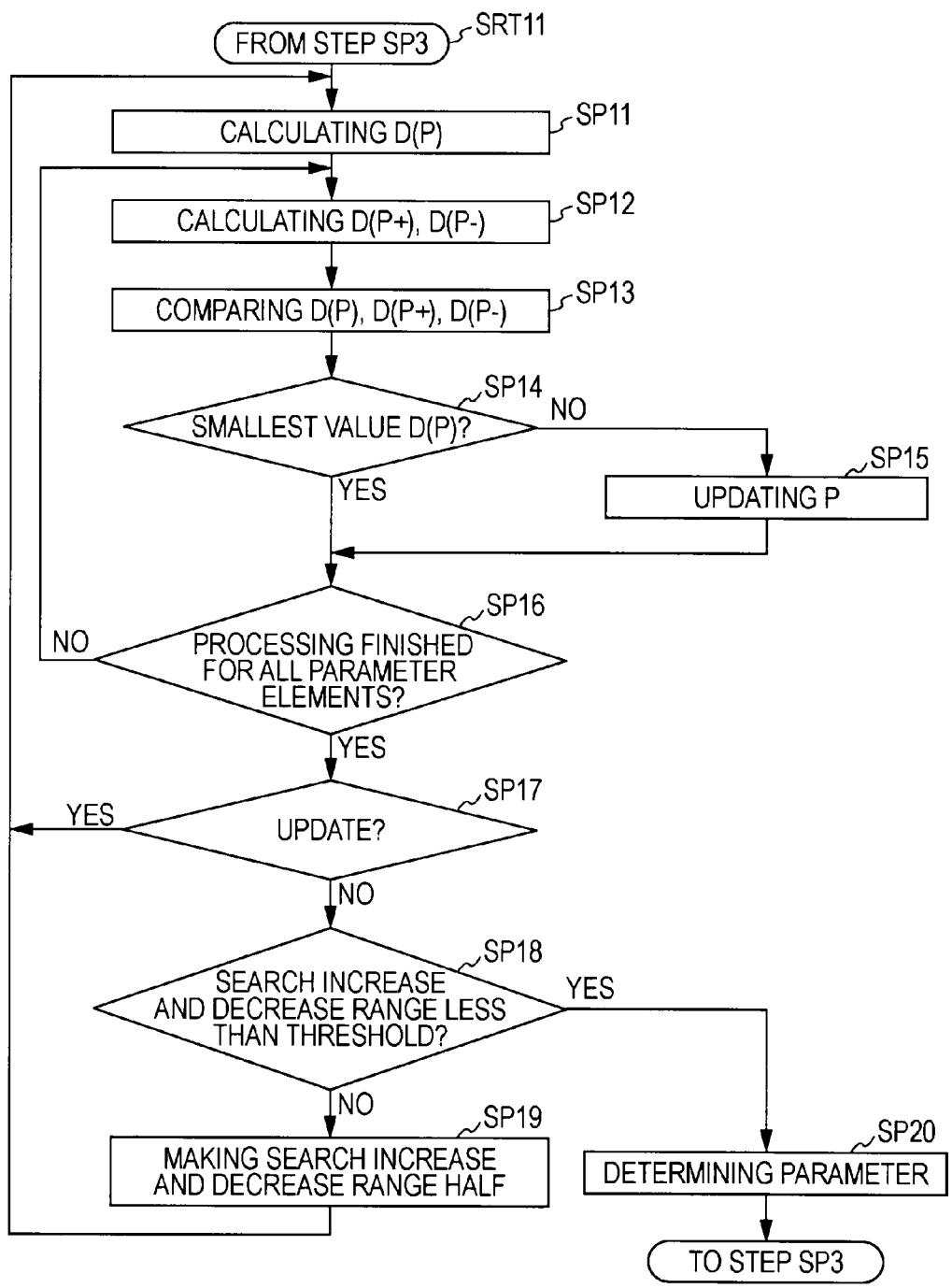
FIG. 10 is a flowchart served for an illustration of a procedure for processing a six parameter individual local search.

Next, a description is given to a six parameter vector field detection process performed in accordance with the six parameter vector field detection program using flowcharts in FIGS. 9 and 10.

As the reference image, which is a frame image subjected to the process, is supplied, the six parameter vector field detector 2 starts six parameter vector field detection process procedure RT1 and moves on to step SP1.

In step SP1, as the six parameter vector field detector 2 detects the full screen motion vector Vg representing a motion of the entire frame image relative to the standard image of the reference image, it moves on to next step SP2.

In step SP2, as the six parameter vector field detector 2 selects the initial parameter $P^t$ out of the first initial value option $P^t\_1$ through the third initial value option $P^t\_3$, it establishes the initial parameter $P^t$ as the current parameter P and moves on to next step SP3.

In step SP3, the six parameter vector field detector 2 moves on to subroutine SRT11 and performs the six parameter individual local search process. At this point, in step SP3 of six parameter vector field detection process procedure RT1, the six parameter vector field detector 2 moves on to step SP11 in subroutine SRT11 (FIG. 10).

In step SP11, as the six parameter vector field detector 2 calculates the difference value D(P) based on the current parameter P in accordance with the expression (8), in which the six parameter vector field is modeled, it moves on to next step SP12.

In step SP12, as the six parameter vector field detector 2 calculates the difference values D(P+) and D(P−) based on the increased parameter P+ and the decreased parameter P−, which are established by increasing and decreasing the parameter elements subjected to the search by the search increase and decrease value ϵ, it moves on to next step SP13.

In step SP13, as the six parameter vector field detector 2 compares the difference values D(P), D(P+), and D(P−), it moves on to next step SP14.

In step SP14, the six parameter vector field detector 2 judges whether or not the difference value D(P) is the smallest value among the difference values D(P), D(P+), and D(P−).

Here, in a case of obtaining a negative result, this signifies that there is a higher possibility in the parameter elements subjected to the search in the increased parameter P+ or the decreased parameter P− of being closer to the optimal solutions than in the parameter elements subjected to the search in the current parameter P. At this point, the six parameter vector field detector 2 moves on to next step SP15.

In step SP15, as the six parameter vector field detector 2 updates the parameter elements subjected to the search in the current parameter P to the parameter elements subjected to the search in the increased parameter P+ or the decreased parameter P−, it moves on to next step SP16.

In contrast, in a case of obtaining a positive result in step SP14, this signifies that there is a high possibility in the parameter elements subjected to the search in the current parameter P of being closer to the optimal solutions than in the parameter elements subjected to the search in the increased parameter P+ or the decreased parameter P−. At this point, the six parameter vector field detector 2 moves on to next step SP16 without updating the element values of the parameter elements (referred to below as search parameters) subjected to the search in the current parameter P.

In step SP16, the six parameter vector field detector 2 judges whether or not all of the six parameter elements are finished with the process. Here, in a case of obtaining a negative result, the six parameter vector field detector 2 moves on to step SP12 to continue the search process and performs a process for the parameter elements subjected to the next search.

In contrast, in a case of obtaining a positive result in step SP16, this signifies that the six parameter elements are finished with the search process. At this point, the six parameter vector field detector 2 moves on to step SP17.

In step SP17, the six parameter vector field detector 2 judges whether or not all parameter elements in the current parameter P are updated.

Here, in a case of obtaining a positive result, this signifies that the six parameter elements are not yet converged. At this point, the six parameter vector field detector 2 moves on to next step SP11 and again performs the search process using the updated current parameter P.

In contrast, in a case of obtaining a negative result in step SP17, this signifies that the six parameter elements are converged and thus the difference value D(P) indicates the minimum value. At this point, the six parameter vector field detector 2 moves on to next step SP18.

In step SP18, the six parameter vector field detector 2 judges whether or not the search increase and decrease range E is less than the threshold. Here, in a case of obtaining a negative result, this signifies that the search increase and decrease range c is large and the accuracy of the detected optimal solutions is not sufficient. At this point, the six parameter vector field detector 2 moves on to next step SP19.

In step SP19, as the six parameter vector field detector 2 decreases the search increase and decrease range $\epsilon$ to half, it goes back to next step SP11 to again perform the search process using the half search increase and decrease range $\epsilon$.

In contrast, in a case of obtaining a positive result in step SP18, this signifies that the search increase and decrease range $\epsilon$ is small and the accuracy of the detected optimal solutions is sufficiently high. At this point, the six parameter vector field detector 2 moves on to next step SP20.

In step SP20, as the six parameter vector field detector 2 determines the six parameter elements in the current parameter P as the optimal solutions, it goes back to step SP3 of six parameter vector field detection process procedure RT1 and moves on to the finishing step to finish the process.

1-6. Behavior and Effect

In the above configuration, in video image data composed of a plurality of frame images, the six parameter vector field detector 2 of the image processing apparatus 1 determines one direction of the frame images as an X direction and a direction perpendicular to the one direction as a Y direction. At this point, the six parameter vector field detector 2 separates the motion from the standard image, which is one frame before the reference image subjected to the process, until the reference image into a motion in the X direction (X vector field) and a motion in the Y direction (Y vector field).

The six parameter vector field detector 2 shows the X vector field and the Y vector field respectively as vector fields composed of a translation component composed of identical magnitude and direction regardless of the positions in the X direction and the Y direction, an X dependent component primarily changing in correspondence with the position in the X direction, and a Y dependent component primarily changing in correspondence with the position in the Y direction. The six parameter vector field detector 2 calculates the translation component, the X dependent component, and the Y dependent component respectively in correspondence with the shown X direction and Y direction.

Here, in image processing apparatuses in the past show a motion representing the entire frame image in a single motion vector as a full screen motion vector. The full screen motion vector often includes an error because components are balanced out in correspondence with the screen. Consequently, it has been difficult for image processing apparatuses in the past to detect a stable full screen motion vector in correspondence with the image and the motion and there has been generated a so-called fluctuations in vectors.

The six parameter vector field detector 2 can show the motion representing the entire frame image as the six parameter vector field that planarly change dependent on the position in the screen. Consequently, the six parameter vector field detector 2 can appropriately represent motions of rotation, zooming, and the like, and thus can stably detect the six parameter vector field.

That is, the six parameter vector field detector 2 represents the motion showing the entire frame image as the six parameter vector field, and thereby can improve the robustness of the six parameter vector field in accordance with the image and the motion compared to the full screen motion vector. As a result, the six parameter vector field detector 2 can improve the accuracy of various image processes using the six parameter vector field that is performed in the later stages.

The six parameter vector field detector 2 determines a position in the X direction with the center of the frame image as the origin as x and a position in the Y direction as y. At this point, the six parameter vector field detector 2 determines the translation component of the X vector field as the translation parameter element $u_0$, the X dependent component in the X vector field as the X dependent parameter element $u_x$ and a multiplication value of x, and the Y dependent component in the X vector field as the Y dependent parameter element $u_y$, and a multiplication value of y. The six parameter vector field detector 2 represents the translation component in the Y vector field as the translation parameter element $v_0$, the X dependent component in the Y vector field as the X dependent parameter element $v_x$ and a multiplication value of x, and the Y dependent component in the Y vector field as the Y dependent parameter element $v_y$ and a multiplication value of y.

Where the vector field is $(u(x, y), v(x, y))$, the six parameter vector field detector 2 models the six parameter vector field in accordance with the expression (1).

This enables the six parameter vector field detector 2 to represent the vector field having the six parameter elements as a linear primary combination. The six parameter vector field detector 2 can detect the six parameter vector field representing a motion of the entire frame image by calculating the six parameter elements.

The six parameter vector field detector 2 calculates the six parameter elements respectively by a local search that searches the optimal solutions while altering in steps of the search increase and decrease value c at least one or more of the six parameter elements composed of the translation parameter elements $u_0$ and $v_0$, the X dependent parameter elements $u_x$ and $v_x$, and the Y dependent parameter elements $u_y$ and $v_y$.

This enables the six parameter vector field detector 2 to dramatically reduce the number of arithmetic processes for the six parameter elements compared to a case of full searching the entire frame image and reduce the load of processing. It is also confirmed that, in reality, the optimal solutions can be almost detected by the local search.

The six parameter vector field detector 2 calculates the difference value D in the entire frame image by subtracting the pixel value of the reference image corresponding to the position of the pixels of the standard image moved in accordance with the six parameter vector field from the pixel values in the pixels of the standard image to determine the condition of the smallest difference value D as the optimal solution.

The six parameter vector field detector 2 calculates the difference value D in accordance with the expression (8) where the coordinates in the standard image are (x, y), the pixel value of the standard image in the coordinates (x, y) is defined as $I_t(x, y)$, and the pixel value in the reference image as $I_{t+1}$.

This enables the six parameter vector field detector 2 to appropriately detect the six parameter vector field representing the motion of the entire frame image.

The six parameter vector field detector 2 alters the current value in the parameter element subjected to the search (that is, the element value of the parameter element subjected to the search in the current parameter P) so as to make the difference value D to get close to be smallest while sequentially altering the search object parameter elements subjected to the search among the six parameter elements. The six parameter vector field detector 2 determines the values of the current parameter P where the difference value D(P) in the six parameter elements before the alteration (that is, based on the current parameter P) become smaller than the difference values D(P+) and D(P−) when all of the six parameter elements are altered in steps of the search increase and decrease value respectively (that is, based on the increased parameter P+ and the decreased parameter P−) as the optimal solutions.

The six parameter vector field detector 2 alters the search object parameter element among the six parameter elements from the current value in steps of the search increase and decrease value $\epsilon$ and calculates the difference values D(P), D(P+), and D(P−) using the search object parameter element before the alteration (in the current parameter P) and the search object parameter elements altered to be increased and decreased (in the increased parameter P+ and the decreased parameter P−). The six parameter vector field detector 2 performs the six parameter individual local search process by determining the element value of the search object parameter element to make the difference value D smallest as the current element value.

In a case that a local search (search process) is performed for all of the six parameter elements and the element value in the current parameter P is not updated in any of the six parameter elements, the six parameter vector field detector 2 determines the current element value as the optimal solution. In a case that a search process is performed for all of the six parameter elements and the current element value is updated in any of the six parameter elements in the current parameter P, the six parameter vector field detector 2 makes the search process to be continued.

The six parameter vector field detector 2 finishes the search process only when the difference values D(P) corresponding to all element values of the six parameter elements in the current parameter P becomes the smallest value. That is, even in a case that one search object parameter element is turned out to be a minimum value, the six parameter vector field detector 2 further performs a search process by altering another parameter element without determining the element value in the search object parameter element as the optimal solution. Consequently, the six parameter vector field detector 2 can effectively prevent from determining a false minimum value as the optimal solution and can lead a correct optimal solution.

The six parameter vector field detector 2 roughly estimates the optimal solution by establishing the search increase and decrease value $\epsilon$ largely and determines the optimal solution using the estimated optimal solution as a starting point by altering the search increase and decrease value $\epsilon$ to be smaller.

In a case that the value of the search increase and decrease value $\epsilon$ at which the optimal solution is estimated is sufficiently small, the six parameter vector field detector 2 determines the estimated optimal solution as the optimal solution.

This enables the six parameter vector field detector 2 to decrease the number of steps in a search process and reduce the load of processing without lowering the accuracy of detecting the optimal solution.

The six parameter vector field detector 2 carries out the search process using the initial parameter $P^t$ selected from a plurality of initial value options, which are the first initial value option $P^t\_1$ through the third initial value option $P^t\_3$, as a starting point.

Since this enables the six parameter vector field detector 2 to perform a search process after establishing a distance until the optimal solution smaller in advance, the number of steps in the search process can be decreased and the load of processing can be reduced, and thus the process time period can be reduced.

The six parameter vector field detector 2 determines the first initial value option $P^t\_1$ with reference to the previous frame parameter $P^{t-1}$, which is a vector field representing a motion from the frame image of two frames before the reference image subjected to the process until the standard image.

The six parameter vector field detector 2 determines the six parameter elements in the previous frame parameter $P^{t-1}$ as the first initial value option $P^t\_1$.

This enables the six parameter vector field detector 2 to establish the distance between the initial parameter $P^t$ and the optimal solution to be very small in such a case, for example, that a constant motion is generated between frame images due to the camcorder moves at a constant speed, and thus the number of steps in the search process can be decreased.

The six parameter vector field detector 2 determines the second initial value option $P^t\_2$ with reference to the full screen motion vector Vg representing the motion of the entire frame image from the standard image until the reference image as a single vector.

In such a case, for example, that the motion between frame images rapidly changes due to a sudden change in the motion of the camcorder, this enables the six parameter vector field detector 2 to predict the rapid change based on the full screen motion vector Vg. As a result, the six parameter vector field detector 2 can establish the distance between the initial parameter $P^t$ and the optimal solution to be small, and the number of steps in the search process can be decreased.

The six parameter vector field detector 2 determines an element that has the values $u_g$ and $v_g$ of the X direction component and the Y direction component of the full screen motion vector Vg respectively as the values of the translation parameter elements $u_0$ and $v_0$, and the respective values of the X dependent parameter elements $u_x$ and $v_x$ and the Y dependent parameter elements $u_y$ and $v_y$ as 0 as the second initial value option $P^t\_2$.

This makes the six parameter vector field detector 2 to use the full screen motion vector Vg represented almost as translation only for the translation component, so that an appropriate value can be established as the second initial value option $P^t\_2$.

The six parameter vector field detector 2 establishes an element that has the respective values of six parameter elements as 0 as the third initial value option $P^t\_3$.

In such a case, for example, that the motion of the camcorder suddenly stops, this enables the six parameter vector field detector 2 to establish the distance between the initial parameter $P^t$ and the optimal solution to be very small and thus the number of steps in the search process can be decreased. In such a case that the image itself greatly changes due to a generation of a flash, fireworks, a scene change, and the like, the six parameter vector field detector 2 can use the unbiased initial parameter $P^t$, and the distance between the initial parameter $P^t$ and the optimal solution can be established to be comparatively small.

The six parameter vector field detector 2 determines the initial value option having the smallest difference value D(P) when representing the six parameter vector field using the first initial value option P'_1 through the third initial value option P'_3 as the initial parameter P'.

This enables the six parameter vector field detector 2 to establish the optimal initial parameter P' from the first initial value option P'_1 through the third initial value option P'_3 based on the difference value D(P).

According to the above configuration, the six parameter vector field detector 2 of the image processing apparatus 1 separates the motion between the standard image and the reference image into the X direction and the Y direction. The six parameter vector field detector 2 models the respective motions in the X direction and the Y direction into six components of translation components displaced regardless of the positions in the X and Y directions, primary X dependent components linearly changing in correspondence with the position in the X direction, and primary Y dependent components linearly changing in correspondence with the position in the Y direction. That is, in step SP11 of subroutine SRT11 showing the six parameter individual local search process, when calculating the difference value D(P) in accordance with the expression (8), the motion between the frame images is represented as the six parameter vector field using the six parameter elements.

The six parameter vector field detector 2 detects the six components (the translation components and the X and Y dependent components for the X and Y vector fields) in the six parameter vector field by calculating the six parameter elements in the six parameter vector field.

Since this enables the six parameter vector field detector 2 to represent the motion between the frame images as the six parameter vector field that primary changes in correspondence with the position in the X direction and the Y direction, the vectors of symmetry coordinates with a difference only in the signs turn out not to be balanced out with each other. In this way, the embodiment of the present invention can provide an image processing apparatus, an image processing method, and a recording medium with an image processing program recorded therein that are able to appropriately represent a motion between frame images.

2. Other Embodiments

Although the above embodiment is described with a case of modifying the element value of each of the parameter elements one by one by the search increase and decrease range ϵ, embodiments of the present invention are not limited to it. For example, a six parameter vector field detector 2 (not shown), corresponding to the six parameter vector field detector 2, selects a combination of the original parameter elements, the parameter elements increased by the search increase and decrease range ϵ, and the parameter elements decreased by the search increase and decrease range ϵ and also a combination of the parameter elements showing the smallest difference values D for all of the six parameter elements.

That is, the six parameter vector field detector 2X searches the optimal solutions while simultaneously altering all values of the six parameter elements in steps of the search increase and decrease value ϵ to calculate the respective six parameter elements.

In this case, although the six parameter vector field detector 2 is supposed to operate the difference values D $3^6$=729 times in one step of the search process and the load of operations is severely increased, the accuracy of the search can be improved. Accordingly, it is preferred to use the approach of the six parameter vector field detector 2X in a case that there is some margin in the operation time period and the processing capacity of itself.

In addition, a six parameter vector field detector 2Y (not shown), corresponding to the six parameter vector field detector 2, increases and decreases the six parameter elements respectively by the search increase and decrease range ϵ to respectively calculate the difference values D. The six parameter vector field detector 2Y updates only one parameter element that has the smallest difference value D.

That is, the six parameter vector field detector 2Y alters the search object parameter element from the current element value in steps of the search increase and decrease value δ and calculates the difference values D(P), D(P+), and D(P−) using the search object parameter element before alteration (in the current parameter P) and the search object parameter elements altered to be increased and decreased (in the increased parameter P+ and the decreased parameter P−). The six parameter vector field detector 2Y compares the difference values D(P), D(P+), and D(P−) for all of the six parameter elements and determines the element value of the search object parameter element having the smallest difference values D(P), D(P+), and D(P−) as the current element value to perform a local search (search process). In a case that the current element values are not updated in any of the six parameter elements, the six parameter vector field detector 2Y determines the element values in the current parameter P as the optimal solutions. The six parameter vector field detector 2Y continues the search process in a case that an element value in the current parameter P is updated in any of the six parameter elements.

In this case, although the operations are only 1+2×6=13 times in one step of the search process, the six parameter vector field detector 2Y updates only one parameter element in one step. Consequently, the six parameter vector field detector 2Y takes a large number of steps until the six parameter elements are converged, and although the accuracy is improved, the processing time period and the number operations are increased as a result.

Still in addition, a six parameter vector field detector 2Z (not shown), corresponding to the six parameter vector field detector 2, can limit the number of steps in a search process in a case that the six parameter vector field detection process is intended to be finished in a predetermined time period because of, for example, the convenience of implementation or the like. In this case, the six parameter vector field detector 2Z provides a branch, for example, between steps SP17 and SP18 in subroutine SRT11 (FIG. 10) and confirms whether or not the number of steps or the time period since the start is less than the predetermined threshold. In a case of equal to or more than the threshold, the six parameter vector field detector 2Z finishes the process and determines the current parameter P as the parameter in the search object vector field. This enables the six parameter vector field detector 2Z to certainly finish the six parameter vector field detection process in the predetermined time period. Such a process is used for image processing that is particularly desired to be in real time and the like.

The above embodiment is described with a case of calculating each of the parameter elements by a local search. Embodiments of the present invention are not limited to it, and they may calculate each of the parameter elements by determining a search range in advance and full searching within the search range.

Further, the above embodiment is described with a case of generating the full screen motion vector Vg by a block matching algorithm. Embodiments of the present invention are not limited to it, and may generate the full screen motion vector Vg by a variety of approaches, such as a representative point matching method, for example.

Further, the above embodiment is described with a case of determining the condition when the difference value D becomes smallest as the optimal solution. Embodiments of the present invention are not limited to this, and may determine a condition when, for example, a sum of squares of the difference value D becomes smallest as the optimal solution. The point is that the optimal solution may be the condition when the image in which the pixels corresponding to the standard image in the reference image are moved by the vector field become nearest to the standard image.

Further, the above embodiment is described with a case of firstly establishing the search increase and decrease value $\epsilon$ largely to roughly estimate the optimal solution, and then altering the search increase and decrease value $\epsilon$ to be smaller using the roughly estimated optimal solution as a starting point. Embodiments of the present invention are not limited to it, and may fix the search increase and decrease value $\epsilon$, for example.

Further, the above embodiment is described with a case of selecting the initial parameter P' out of the plurality of initial value options of the first initial value option P'_1 through the third initial value option P'_3. Embodiments of the present invention are not limited to it, and may not limit the number of the initial value options and the initial value options may be established in two or four or more, and the initial parameter P' may be fixed to one. The established initial value options can use a variety of parameters, such as establishing an arbitrary numerical value, for example.

Further, the above embodiment is described with a case of referring the vector field representing the motion from the frame image of two frames before until the standard image by determining the previous frame vector field as the first initial value option P'_1. Embodiments of the present invention are not limited to it, and may determine ½, for example, of the previous frame vector field as the first initial value option P'_1. This enables an embodiment of the present invention to establish a value of near in the search distance as the initial parameter P' in such a case, for example, that the motion of the camcorder is slowed down.

Further the above embodiment is described with a case of referring the full screen motion vector Vg by using the full screen motion vector Vg only for the translation component in the second initial value option P'_2. Embodiments of the present invention are not limited to it, and may regard, for example, a part of the full screen motion vector Vg as of rotation and determine a predetermined ratio of the full screen motion vector Vg as the X dependent parameter elements $u_x$ and $v_x$ and the Y dependent parameter elements $u_y$ and $v_y$.

Further, the above embodiment is described with a case of using, in an operation of the difference value D in one step of the search process, the element values at the time of starting the search process for the element values other than the search object parameter element. Embodiments of the present invention are not limited to it, and may successively calculate the difference values D using the updated latest element values. In this case, the six parameter vector field detector successively calculates difference values D(P) in the current parameter P.

Further, the above embodiment is described with a case of calculating the difference value D in accordance with the expression (8). Embodiments of the present invention are not limited to it, and may determine a value of, for example, subtracting the pixel value of the standard image moved by the six parameter vector field from the pixel value of the reference image as the difference value D.

Further, in the above embodiment, one still image is referred to as a frame image and the movement of the pixels between the frame images is not particularly defined. Embodiments of the present invention is applicable to the progressive technique in which pixels do not move between the frame images and also the interlace technique in which pixels move between the frame images. In a case of applying an embodiment of the present invention to the interlace technique, the number of steps in the search process can be decreased by establishing a constant composed of the amount of the pixel movement for the translation parameter element $v_0$ in the Y direction as the third initial value option P'_3.

Further, the above embodiment is described with a case of determining the frame image of one frame before the reference image subjected to the process as the standard image. Embodiments of the present invention are not limited to it, and may determine a frame image in the proximity of the reference image, for example, a frame image of two frames before or one frame after as the standard image.

Further, although the six parameter vector field detection program or the like is stored in advance in a ROM, a hard disk drive, or the like in the embodiment described above, embodiments of the present invention are not limited to it and may be installed from an external storage medium, such as a memory Stick® of Sony Corporation, into a flash memory or the like. A database generation program or the like may also be obtained from outside via a wireless LAN (local area network), such as a USB (universal serial bus) and the Ethernet® of Institute of Electrical and Electronics Engineers 802.11a/b/g, and may further be distributed by terrestrial digital television broadcasting or BS digital television broadcasting.

Further, the above embodiment is described with a case of configuring the image processing apparatus 1 as an image processing apparatus with the difference calculation unit 14 as a modeling unit, the difference calculation unit 14, the parameter update unit 15, and the convergence judgment unit 16 as calculation units. Embodiments of the present invention are not limited to it, and image processing apparatus according to an embodiment of the present invention may also be configured with a modeling unit and calculation units of a variety of configurations.

The present application contains subject matter related to that disclosed in Japanese Priority Patent Application JP 2009-100173 filed in the Japan Patent Office on Apr. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing apparatus, comprising:
a modeling unit, in video image data composed of a plurality of frame images where one direction in each of the frame images is defined as an X direction and a direction perpendicular to the one direction as a Y direction, separating a motion from a standard image, which is one frame before a reference image subjected to a process, until the reference image into a motion in the X direction and a motion in the Y direction and representing the motion in the X direction and the motion in the Y direction respectively as vector fields composed of a translation component composed of identical magnitude and direction regardless of positions in the X direction and the Y direction, an X dependent component primarily changing in correspondence with the position in the X direction, and a Y dependent component primarily changing in correspondence with the position in the Y direction; and a calculation unit respectively calculating the translation component, the X dependent component, and the Y dependent component corresponding to the X direction and the Y direction represented by the modeling unit, wherein when a position in the X direction with a center of the frame image as an origin is x and a position in the Y direction as y, the modeling unit represents the translation component in the X direction as a translation parameter element $u_0$, the X dependent component in the motion in the X direction as an X dependent parameter element $u_x$ and a multiplication value of x, the Y dependent component in the motion in the X direction as a Y dependent parameter element $u_y$ and a multiplication value of y, the translation component in the motion in the Y direction as a translation parameter element $v_0$, the X dependent component in the motion in the Y direction as an X dependent parameter element $v_x$ and a multiplication value of x, and the Y dependent component in the motion in the Y direction as a Y dependent parameter element $v_y$ and a multiplication value of y, wherein when the vector fields are defined as (u(x, y), v(x, y)), the vector fields are modeled in accordance with an expression below:

$$(u(x,y), v(x,y))=(u_0+u_xx+u_yy, v_0+v_xx+v_yy) \quad (1),$$

and wherein by a local search searching an optimal solution while altering at least one or more of six parameter elements, composed of the translation parameter elements $u_0$ and $v_0$, the X dependent parameter elements $u_x$ and $v_x$, and the Y dependent parameter elements $u_y$ and $v_y$, in steps of a search increase and decrease value, the calculation unit respectively calculates the six parameter elements.

2. The image processing apparatus according to claim 1, wherein by subtracting a pixel value of the reference image corresponding to a position of a pixel of the standard image moved in accordance with the vector fields from a pixel value in a pixel of the standard image, the calculation unit calculates a difference value in the entire frame image to determine a condition when the difference value becomes smallest as the optimal solution.

3. The image processing apparatus according to claim 2, wherein when coordinates in the standard image are (x, y), the pixel value of the standard image in the coordinates (x, y) is defined as $I_t(x, y)$, and a pixel value in the reference image as $I_{t+1}$, the calculation unit calculates the difference value in accordance with an expression below:

$$D(u, v) = \sum_x \sum_y |I_{t+1}(x + u_0 + u_xx + u_yy, y + v_0 + v_xx + v_yy) - I_t(x, y)|. \quad (2)$$

4. The image processing apparatus according to claim 3, wherein while sequentially altering a search object parameter element subjected to the search among the six parameter elements, the calculation unit alters a current value in the search object parameter element in such a way that the difference value gets close to be smallest and determines values of the six parameter elements before the alteration as the optimal solution when the difference value in the six parameter elements before the alteration becomes smaller than the difference value when all of the six parameter elements are respectively altered in steps of the search increase and decrease value.

5. The image processing apparatus according to claim 4, wherein the calculation unit has a parameter update unit performing the local search by altering the search object parameter element among the six parameter elements from the current value in steps of the search increase and decrease value, calculating the difference value using the search object parameter element before the alteration and the search object parameter elements altered to be increased and decreased, and determining a value of the search object parameter element when the difference value becomes smallest as the current value, and a convergence judgment unit that, in a case that the local search by the parameter update unit is performed for all of the six parameter elements and the current value is not updated in any of the six parameter elements, determines the current value as the optimal solution and, in a case that the local search by the parameter update unit is performed for all of the six parameter elements and the current value is updated in any of the six parameter elements, continues the local search in the parameter update unit.

6. The image processing apparatus according to claim 1, wherein the calculation unit roughly estimates the optimal solution by establishing the search increase and decrease value largely, and determines the optimal solution using the estimated optimal solution as a starting point by altering the search increase and decrease value to be smaller.

7. The image processing apparatus according to claim 6, wherein the calculation unit determines the estimated optimal solution as the optimal solution in a case that a value of the search increase and decrease value when the optimal solution is estimated is sufficiently small.

8. The image processing apparatus according to claim 1, wherein the calculation unit carries out the local search using an initial parameter selected from a plurality of initial value options as a starting point.

9. The image processing apparatus according to claim 8, wherein the calculation unit determines one of the initial value options with reference to vector fields representing a motion from a frame image of two frames before the reference image until the standard image.

10. The image processing apparatus according to claim 9, wherein the calculation unit determines the six parameter elements in the vector fields representing the motion from the frame image of two frames before the reference image until the standard image as one of the initial value option.

11. The image processing apparatus according to claim 8, wherein the calculation unit determines one of the initial value options with reference to a full screen vector representing a motion of the entire frame image from the standard image until the reference image as a single vector.

12. The image processing apparatus according to claim 11, wherein the calculation unit determines one of the initial value options to be values of an X direction component and a Y direction component of the full screen vector respectively determined as values of the translation parameter elements $u_0$ and $v_0$ and values of the X dependent parameter elements $u_x$ and $v_x$ and the Y dependent parameter elements $u_y$ and $v_y$, respectively determined as 0.

13. The image processing apparatus according to claim 8, wherein the calculation unit determines one of the initial value options to be values of the six parameter elements respectively determined as 0.

14. The image processing apparatus according to claim 2, wherein upon carrying out the local search using an initial parameter selected from a plurality of initial value options as a starting point, the calculation unit determines one of the initial value options with the difference value to be smallest when representing the vector fields using the plurality of initial value options as the initial parameter.

15. The image processing apparatus according to claim 1, wherein the calculation unit respectively calculates the six parameter elements by searching the optimal solution while simultaneously altering values of all of the six parameter elements in steps of the search increase and decrease value.

16. An image processing method, comprising the steps of:
modeling, in video image data composed of a plurality of frame images where one direction in each of the frame images is defined as an X direction and a direction perpendicular to the one direction as a Y direction, separating a motion from a standard image, which is one frame before a reference image subjected to a process, until the reference image into a motion in the X direction and a motion in the Y direction and representing the motion in the X direction and the motion in the Y direction respectively as vector fields composed of a translation component composed of identical magnitude and direction regardless of positions in the X direction and the Y direction, an X dependent component primarily changing in correspondence with the position in the X direction, and a Y dependent component primarily changing in correspondence with the position in the Y direction; and calculating the translation component, the X dependent component, and the Y dependent component corresponding to the X direction and the Y direction represented by the step of modeling, wherein when a position in the X direction with a center of the frame image as an origin is x and a position in the Y direction as y, the modeling unit represents the translation component in the X direction as a translation parameter element $u_0$, the X dependent component in the motion in the X direction as an X dependent parameter element $u_x$ and a multiplication value of x, the Y dependent component in the motion in the X direction as a Y dependent parameter element $u_y$ and a multiplication value of y, the translation component in the motion in the Y direction as a translation parameter element $v_0$, the X dependent component in the motion in the Y direction as an X dependent parameter element $v_x$ and a multiplication value of x, and the Y dependent component in the motion in the Y direction as a Y dependent parameter element $v_y$ and a multiplication value of y, wherein when the vector fields are defined as (u(x, y), v(x, y)), the vector fields are modeled in accordance with an expression below:

$$(u(x,y), v(x,y)) = (u_0 + u_x x + u_y y, v_0 + v_x x + v_y y) \quad (1),$$

and wherein by a local search searching an optimal solution while altering at least one or more of six parameter elements, composed of the translation parameter elements $u_0$ and $v_0$, the X dependent parameter elements $u_x$ and $v_x$, and the Y dependent parameter elements $u_y$ and $v_y$, in steps of a search increase and decrease value, the calculation unit respectively calculates the six parameter elements.

17. A non-transitory recording medium, comprising an image processing program recorded therein that makes a computer to perform the steps of:
modeling, in video image data composed of a plurality of frame images where one direction in each of the frame images is defined as an X direction and a direction perpendicular to the one direction as a Y direction, separating a motion from a standard image, which is one frame before a reference image subjected to a process, until the reference image into a motion in the X direction and a motion in the Y direction and representing the motion in the X direction and the motion in the Y direction respectively as vector fields composed of a translation component composed of identical magnitude and direction regardless of positions in the X direction and the Y direction, an X dependent component primarily changing in correspondence with the position in the X direction, and a Y dependent component primarily changing in correspondence with the position in the Y direction; and calculating the translation component, the X dependent component, and the Y dependent component corresponding to the X direction and the Y direction represented by the step of modeling, wherein when a position in the X direction with a center of the frame image as an origin is x and a position in the Y direction as y, the modeling unit represents the translation component in the X direction as a translation parameter element $u_0$, the X dependent component in the motion in the X direction as an X dependent parameter element $u_x$ and a multiplication value of x, the Y dependent component in the motion in the X direction as a Y dependent parameter element $u_y$ and a multiplication value of y, the translation component in the motion in the Y direction as a translation parameter element $v_0$, the X dependent component in the motion in the Y direction as an X dependent parameter element $v_x$ and a multiplication value of x, and the Y dependent component in the motion in the Y direction as a Y dependent parameter element $v_y$ and a multiplication value of y, wherein when the vector fields are defined as (u(x, y), v(x, y)), the vector fields are modeled in accordance with an expression below:

$$(u(x,y), v(x,y)) = (u_0 + u_x x + u_y y, v_0 + v_x x + v_y y) \quad (1),$$

and wherein by a local search searching an optimal solution while altering at least one or more of six parameter elements, composed of the translation parameter elements $u_0$ and $v_0$, the X dependent parameter elements $u_x$ and $v_x$, and the Y dependent parameter elements $u_y$ and $v_y$, in steps of a search increase and decrease value, the calculation unit respectively calculates the six parameter elements.

* * * * *